US012677184B2

(12) United States Patent
Fu et al.

(10) Patent No.: US 12,677,184 B2
(45) Date of Patent: Jul. 7, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventors: Zhe Fu, Dongguan (CN); Xue Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 302 days.

(21) Appl. No.: 18/222,733

(22) Filed: Jul. 17, 2023

(65) Prior Publication Data

US 2023/0362707 A1      Nov. 9, 2023

Related U.S. Application Data

(63) Continuation of application No. PCT/CN2021/072943, filed on Jan. 20, 2021.

(51) Int. Cl.
H04W 28/02          (2009.01)

(52) U.S. Cl.
CPC ...  H04W 28/0236 (2013.01); H04W 28/0257 (2013.01); H04W 28/0284 (2013.01)

(58) Field of Classification Search
CPC ......... H04W 28/0236; H04W 28/0257; H04W 28/0284; H04L 47/283
See application file for complete search history.

(56) References Cited

U.S. PATENT DOCUMENTS

2020/0084659 A1*  3/2020  Pan ..................... H04W 28/06
2020/0205177 A1   6/2020  Prakash et al.
(Continued)

FOREIGN PATENT DOCUMENTS

CN      104918283 A     9/2015
CN      105101289 A     11/2015
(Continued)

OTHER PUBLICATIONS

Communication pursuant to Article 94(3) EPC issued by the EPO for Application No. 21920224.9 mailed on Aug. 28, 2024.
(Continued)

*Primary Examiner* — Bailor C Hsu
(74) *Attorney, Agent, or Firm* — Sheppard, Mullin, Richter & Hampton LLP

(57) ABSTRACT
The embodiment of the present disclosure provides a wireless communication method and device. The wireless communication method includes: transmitting, by a first device, first information to a second device. The first information is used by the second device to determine at least one of: a message loss, a packet loss, a PDB corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered, reported survival time not being satisfied, reconfiguration or modification of service transmission being requested towards a peer end, and whether a packet transmission delay exceeds a PDB.

17 Claims, 4 Drawing Sheets

200

(56) References Cited

U.S. PATENT DOCUMENTS

| | | | | |
|---|---|---|---|---|
| 2021/0021536 | A1* | 1/2021 | Ganesan | H04L 47/56 |
| 2022/0015068 | A1* | 1/2022 | Gholmieh | H04W 72/1268 |
| 2022/0070718 | A1* | 3/2022 | Luo | H04W 76/12 |
| 2022/0124043 | A1* | 4/2022 | Zhu | H04L 47/2441 |
| 2022/0377760 | A1* | 11/2022 | Sun | H04W 72/543 |
| 2022/0417972 | A1* | 12/2022 | Rossbach | H04W 72/20 |
| 2023/0031423 | A1* | 2/2023 | Gandhi | H04L 45/123 |
| 2024/0107547 | A1* | 3/2024 | Wu | H04W 72/23 |
| 2024/0334222 | A1* | 10/2024 | Talebi Fard | H04W 24/08 |

FOREIGN PATENT DOCUMENTS

| | | |
|---|---|---|
| CN | 106301696 A | 1/2017 |
| WO | 2020101980 A1 | 5/2020 |
| WO | 2020167231 A1 | 8/2020 |

OTHER PUBLICATIONS

International Search Report and Written Opinion dated Oct. 25, 2021 in International Application No. PCT/CN2021/072943. English translation attached.

"3rd Generation Partnership Project; Technical Specification Group Radio Access Network;NR;Layer 2 Measurements; (Release 16)" 3GPP TS 38.314 V16.1.0, Nov. 2020.

Communication pursuant to Article 94(3) EPC issued by the European Patent Office for Application No. 21920224.9 mailed on Mar. 10, 2025.

Extended European Search Report dated Dec. 13, 2023 received in European Patent Application No. EP21920224.9.

Huawei et al:"RAN enhancements based on new QoS related parameters" 3GPP Draft; R2-2100216, 3rd Generation Partnership Project (3GPP, Mobile Competence Centre ; 650, Route Des Lucioles; F-06921 Sophia-Antipolis Cedex) France, vol. RAN WG2,No. Online; Jan. 25, 2021-Feb. 5, 2021, Jan. 15, 2021 (Jan. 15, 2021), XP051973424.

Intel Corporation:"Support for Survival Time and Burst Spread" 3GPP Draft; R2-2100614, 3rd (Generation Partnership Project (3GPP), Mobile Competence Centre : 650, Route Des Lucioles ; F-06921 Sophia-Antipolis Cedex1 France, vol. RAN WG2, No. e-Meeting; Jan. 25, 2020-Feb. 5, 2020,Jan. 15, 2021 (Jan. 15, 2021), XP051973738.

Communication pursuant to Article 94(3) EPC issued by the European Patent Office for Application No. 21920224.9 mailed on Aug. 25, 2025.

Communication pursuant to Article 94(3) EPC issued by the European Patent Office for Application No. 21920224.9 mailed on Feb. 13, 2026, 9 pages.

* cited by examiner

<u>100</u>

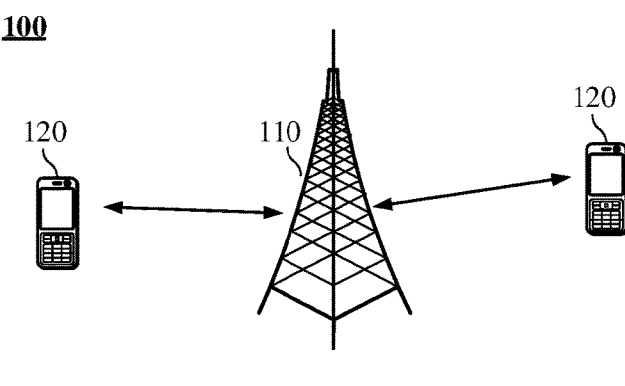

| First Device | | Second Device |

S210: First device transmits first information to second device, the first information being used by second device to determine at least one of: a message loss, a packet loss, a PDB corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered, reported survival time not being satisfied, reconfiguration or modification of service transmission being requested towards a peer end, and whether a packet transmission delay exceeds a PDB S220: Second device receives the first information transmitted by first device

First device starts or activates survival time under a second condition, or starts or activates monitoring of the survival time under the second condition, or starts a timer corresponding to the survival time under the second condition,
the second condition including at least one of:
packet transmission error, message transmission error, packet transmission, and message transmission

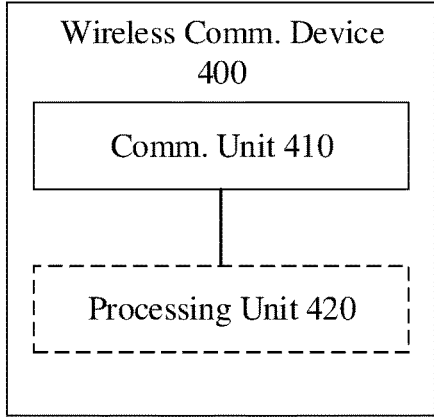

FIG. 6

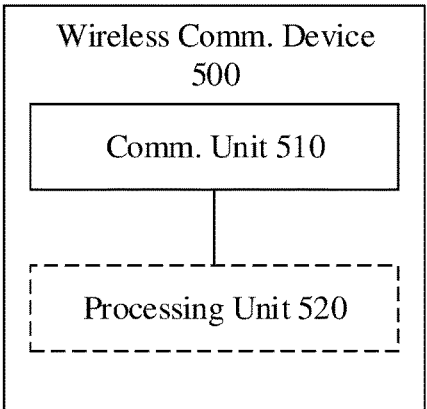

FIG. 7

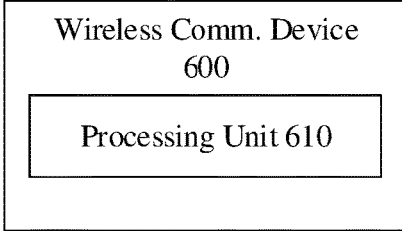

FIG. 8

WIRELESS COMMUNICATION METHOD AND DEVICE

CROSS-REFERENCE TO RELATED APPLICATIONS

This application is a continuation of International Application No. PCT/CN2021/072943 filed on Jan. 20, 2021, the entire contents of which are incorporated herein by reference.

TECHNICAL FIELD

The embodiments of the present disclosure relate to the field of the communication technology, and more particularly, to a wireless communication method and device.

BACKGROUND

In the New Radio (NR) system, Packet Delay Budget (PDB) measurement is introduced for data packet delay measurement. However, it is currently impossible to accurately determine whether a transmission delay exceeds the PDB, especially for some Time Sensitive Communication (TSC) services, which degrades data transmission performance.

SUMMARY

The embodiments of the present disclosure provide a wireless communication method and device.

In a first aspect, a wireless communication method is provided. The method includes:

transmitting, by a first device, first information to a second device.

The first information is used by the second device to determine at least one of:

a message loss, a packet loss, a Packet Delay Budget (PDB) corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered, reported survival time not being satisfied, reconfiguration or modification of service transmission being requested towards a peer end, and whether a packet transmission delay exceeds a PDB.

In a second aspect, a first device is provided. The first device includes: a processor and a memory, wherein the memory is configured to store a computer program, and the processor is configured to invoke and execute the computer program stored in the memory to perform a wireless communication method.

The method includes transmitting, by the first device, first information to a second device, wherein the first information is used by the second device to determine at least one of:

a message loss, a packet loss, a Packet Delay Budget (PDB) corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered, reported survival time not being satisfied, reconfiguration or modification of service transmission being requested towards a peer end, and whether a packet transmission delay exceeds a PDB.

In a third aspect, a second device is provided. The second device includes: a processor and a memory, wherein the memory is configured to store a computer program, and the processor is configured to invoke and execute the computer program stored in the memory to perform a wireless communication method.

The method includes: receiving, by the second device, first information transmitted by a first device, wherein the first information is used by the second device to determine at least one of:

a message loss, a packet loss, a Packet Delay Budget (PDB) corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered, reported survival time not being satisfied, reconfiguration or modification of service transmission being requested towards a peer end, and whether a packet transmission delay exceeds a PDB.

BRIEF DESCRIPTION OF DRAWINGS

FIG. 1 is a schematic diagram showing an architecture of a communication system in which an embodiment of the present disclosure.

FIG. 2 is a flowchart illustrating a wireless communication method according to an embodiment of the present disclosure.

FIG. 5 is a flowchart illustrating another wireless communication method according to another embodiment of the present disclosure.

FIG. 6 is a schematic block diagram of a wireless communication device according to an embodiment of the present disclosure.

FIG. 7 is a schematic block diagram of another wireless communication device according to an embodiment of the present disclosure.

FIG. 8 is a schematic block diagram of yet another wireless communication device according to an embodiment of the present disclosure.

DESCRIPTION OF EMBODIMENTS

Figure 3:
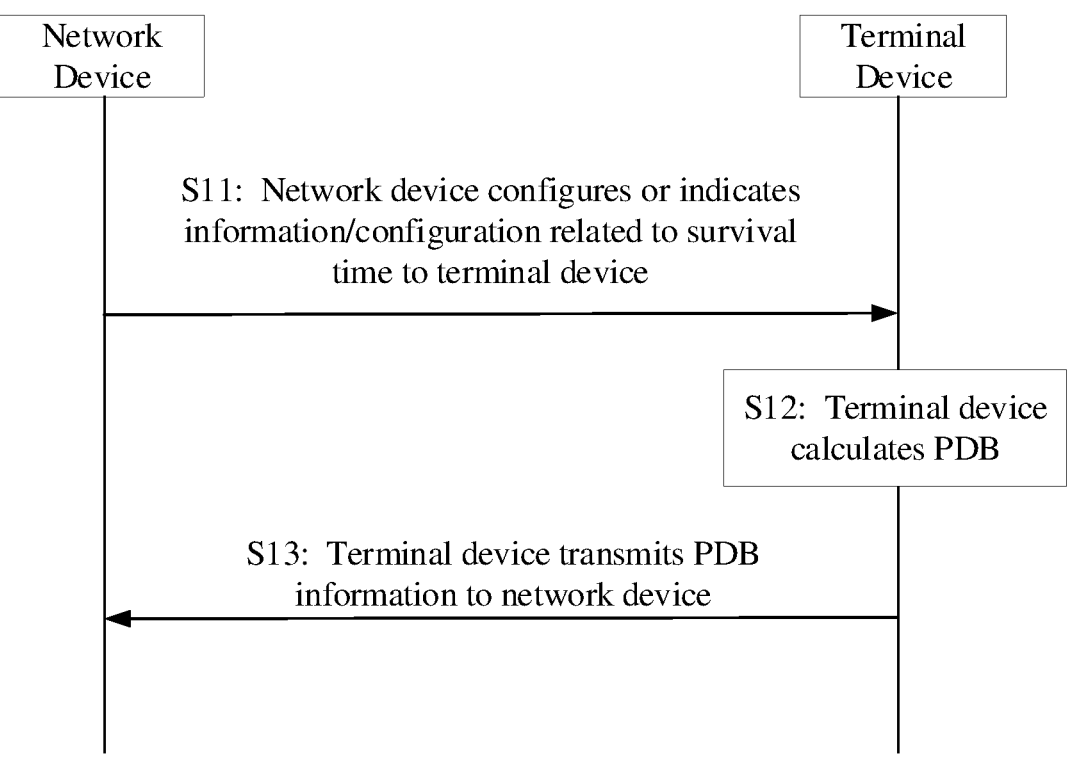
FIG. 3 is a flowchart illustrating a terminal device reporting PDB information according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device, or the like.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, or the like.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 shows a communication system 100 in which an embodiment of the present disclosure can be applied. A shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In order to better understand the embodiments of the present disclosure, the survival time related to the present disclosure will be described.

For an application or service, when the survival time is represented by a service cycle, if survival time=period, then after transmission of a previous packet fails, the next packet must be transmitted correctly. Otherwise, a communication service transmission error occurs.

In other words, for an application or service, when the survival time is represented by consecutive erroneously transmitted packets, if survival time=X consecutive erroneously transmitted packets, then when X consecutive packets are transmitted erroneously, a communication service transmission error occurs. Therefore, when transmission of X-1 consecutive packets fails, the next packet must be transmitted correctly.

A burst corresponds to a message, and a burst includes one or more packets.

In order to better understand the embodiments of the present disclosure, the PDB related to the present disclosure will be described.

A current (Immediate) Minimization of Drive Test (MDT) includes Quality of Service (QoS) check related measurements, which are used to evaluate whether the communication in a certain area at a certain time meets QoS requirements. For example, measurements as defined in M6 in the communication protocol TS 37.320, Sections 5.2.1.1 and 5.4.1.1 are measurements for a PDB. Taking NR as an example, the measurement quantities and measurement method of M6 will be introduced.

M6: Uplink and downlink data packet delay measurement, for each Data Radio Bearer (DRB) of each UE, specifically:

Uplink data packet delay:

D1: Uplink Packet Data Convergence Protocol (PDCP) delay, which refers to a PDCP queuing delay of each DRB measured at the UE, that is, the time interval from a PDCP packet arriving at a higher layer of a Service Access Point (SAP) to obtaining a UL grant for data packet transmission;

D2.1: Air interface delay, which refers to a time interval from transmission time indicated by a scheduling grant (grant) to successfully receiving a transmitted data block;

D2.2: Radio Link Control (RLC) delay, which refers to a time interval from an RLC layer receiving an RLC Protocol Data Unit (PDU) containing the first RLC Service Data Unit (SDU) to the RLC layer delivering the RLC SDU to the PDCP layer;

D2.3: Delay on F1-U interface, which refers to a time interval for delivering a data packet from a Distributed Unit (DU) to a Centralized Unit (CU);

D2.4: PDCP reordering delay, which refers to a time interval from the PDCP layer receiving a PDCP PDU to the PDCP layer delivering the PDCP SDU to a higher layer SAP.

Therefore, the uplink data packet delay is defined as D1+D2.1+D2.2+D2.3+D2.4, where D1 is reported from the UE to the RAN.

Downlink packet delay:

D1: Air interface delay, which refers to a time interval from an RLC SDU arriving at a Media Access Control (MAC) layer to receiving a feedback from the UE indicating that the RLC SDU is successfully received;

D2: Delay on gNB-DU, which refers to a time interval from an RLC SDU arriving at the RLC layer to delivering the RLC SDU to the MAC layer;

D3: Delay on F1-U interface, which refers to a time interval for delivering a data packet from a CU to a DU;

D4: Delay on CU-UP interface, which refers to a time interval from receiving a Service Data Adaptation Protocol (SDAP) SDU to delivering the PDCP SDU to the DU.

Therefore, the downlink data packet delay is defined as D1+D2+D3+D4.

It should be noted that if the service transmission cannot meet the requirement of the survival time, the transmission needs to be adjusted. It is determined whether to meet the requirement of the survival time based on whether the PDB is exceeded. Currently, the UE does not know the PDB at the base station. The base station obtains a packet average PDB according to the UE report, and the time length for calculating the average PDB is basically an average PDB value of all packets within the time interval between two measurement reports. Typically, the minimum time interval between two measurement reports is 160 ms. This is far greater than the TSC service requirement (the minimum TSC service cycle is 0.5 ms, and the survival time may be several times greater than the cycle, e.g., on the order of 10 ms). Therefore, before the average PDB is reported for the second time, it may be considered that the peer end is using the previous PDB value and thus considered that there is no problem, but in fact the survival time has expired. Therefore, a method for determining a PDB accurately needs to be considered to ensure the transmission performance.

In view of the above problems, the present disclosure provides a solution for determining a PDB, capable of determining the PDB accurately.

The technical solutions of the present disclosure will be described in detail below with reference to specific embodiments.

FIG. 2 is a schematic flowchart illustrating a wireless communication method 200 according to an embodiment of the present disclosure. As shown in FIG. 2, the method 200 may include at least part of the following content.

At S210, a first device transmits first information to a second device.

The first information is used by the second device to determine at least one of:

a message loss, a packet loss, a Packet Delay Budget (PDB) corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered (e.g., reconfiguration or scheduling for a service transmission being triggered), reported survival time not being satisfied, reconfiguration or modification of service transmission being requested towards a peer end, and whether a packet transmission delay exceeds the PDB.

At S220, the second device receives the first information transmitted by the first device.

In an embodiment of the present disclosure, the second device may determine at least one of the following based on the first information:

a message loss, a packet loss, a Packet Delay Budget (PDB) corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered (e.g., reconfiguration or scheduling for a service transmission being triggered), reported survival time not being satisfied, reconfiguration or modification of service transmission being requested towards a peer end, and whether a packet transmission delay exceeds the PDB.

Therefore, the second device can determine whether the transmission delay exceeds the PDB accurately, so as to ensure the transmission performance of the TSC service.

In addition, in some embodiments, the first device may further determine whether the packet transmission delay exceeds the PDB, and indicate to the second device the result of whether the packet transmission delay exceeds the PDB.

In some embodiments, whether the packet transmission delay exceeds the PDB, means whether the packet transmission delay exceeds a specific time period. Exemplarily, the specific time period may be PDCP discard time.

In some embodiments, the first information may be PDB information, or the first information may be packet start time information, or the first information may be packet arrival information, or the first information may be feedback information.

For example, the PDB information may be measured or calculated by the first device.

For example, the packet start time information may be measured or calculated by the first device, or the packet start time information may be information obtained or saved by the first device.

For example, the packet arrival information may be time at which the packet arrives at a PDCP layer.

For example, the feedback information may be carried in at least one of: Downlink Control Information (DCI), a Hybrid Automatic Repeat Request Acknowledgement (HARQ-ACK), a Radio Link Control (RLC) status PDU, and a PDCP status PDU.

Here, the HARQ-ACK may be an ACK or a Negative Acknowledgment (NACK).

In some embodiments, the first device may be a terminal device, and the second device may be a network device. For example, the first information may correspond to an uplink transmission or a downlink transmission.

In some embodiments, the first device may be a network device, and the second device may be a terminal device. For example, the first information may correspond to a downlink transmission or an uplink transmission.

In some embodiments, the first information may be for at least one of:

a terminal (UE), a DRB, a QoS flow, a PDU session, a logical channel, a logical channel group, an SDU, and a PDU.

That is, the first information may be for a specific object, and the specific object may be at least one of:

a terminal (UE), a DRB, a QoS flow, a PDU session, a logical channel, a logical channel group, an SDU, and a PDU.

In some embodiments, the SDU and PDU may be for at least one of: PDCP, RLC, and SDAP. That is, it may be a PDCP SDU and a PDCP PDU, an RLC SDU and an RLC PDU, or an SDAP SDU and an SDAP PDU.

In some embodiments, the packet described herein may include at least one of:

an SDU and a PDU.

Exemplarily, the packet described in the present disclosure may be a PDCP SDU or a PDCP PDU, an RLC SDU or an RLC PDU, or an SDAP SDU or an SDAP PDU.

In some embodiments, the message described in the present disclosure may include at least one of:

a Media Access Control (MAC) SDU, a MAC PDU, and a Transport block (TB).

In some embodiments, the above S210 may specifically be:

the first device transmits the first information to the second device with a target time length as a cycle.

Here, the target time length is a time length of the Y burst cycles, where Y is a positive integer; or the target time length is a time length of the survival time; or the target time length is a time length smaller than or equal to consecutive burst cycles within the survival period; or the target time length is a time length of a burst cycle; or the target time length is a time length of each packet.

That is, the first device may transmit the first information to the second device cyclically.

In some embodiments, the above S210 may specifically be:

the first device transmits the first information to the second device when a target event is triggered.

Here, the target event may include at least one of:

target packet arrival, packet arrival, packet arrival time obtained, average packet arrival time obtained, maximum packet arrival time obtained, survival time reached, maximum error tolerance time reached, and maximum error reporting tolerance time reached.

That is, the first device may transmit the first information to the second device when an event is triggered.

For example, the target packet may be a last packet in a burst cycle, or the target packet may be a first packet in a burst cycle.

In some embodiments, the above S210 may specifically be:

the first device transmits the first information to the second device according to first indication information and/or a first condition.

Here, the first condition may include survival time being configured or indicated, or the first condition may include the first indication information being configured or indicated, and the first indication information may be used to instruct the first device to report or indicate the first information to the second device.

In some embodiments, the first device may obtain information/configuration related to the survival time.

The information/configuration related to the survival time may include, but not limited to, at least one of:

a data transmission direction (for example, uplink or downlink direction), the survival time, a DRB identifier, a QoS flow identifier, a PDU session identifier, service arrival time, a service pattern, a service cycle, and the first indication information.

In some embodiments, the information/configuration related to the survival time may be configured by an access network (e.g., via a Radio Resource Control (RRC) message), or the information/configuration related to the survival time may be pre-configured or agreed in the protocol, or the information/configuration related to the survival time may be configured or indicated by a core network device (e.g., an Access and Mobility Management Function (AMF) entity) via e.g., a Non-Access Stratum (NAS) message, a NAS PDU, etc.

For example, the first device may be a terminal device, the information/configuration related to the survival time may be indicated to the terminal device by a serving cell, or the information/configuration related to the survival time may be indicated to the terminal device by an AMF entity, or the information/configuration related to the survival time may be pre-configured for the terminal device, or the information/configuration related to the survival time may be pre-written in a protocol.

In some embodiments, as Example 1, the first information may be PDB information, and the first information may include, but not limited to, at least one of:

a packet average PDB within at least one burst, a packet average PDB within each burst, a maximum packet average PDB within a first time length, a minimum packet average PDB within the first time length, a maximum packet PDB within at least one burst value, a maximum packet PDB within each burst, a minimum packet PDB within at least one burst, a minimum packet PDB within each burst, a maximum packet PDB within the first time length, a maximum packet PDB within the first time length, a minimum packet PDB within the first time length, an average packet PDB within the first time length, a PDB of at least one packet, a PDB of each packet, a maximum packet PDB within the first time length, and a minimum packet PDB within the first time length.

For example, the maximum average packet PDB may be a maximum value among packet average PDBs within at least one burst within the first time length.

For example, the minimum average packet PDB may be a minimum value among average packet PDBs within at least one burst within the first time length.

In Example 1, for example, the first time length may be determined based on the survival time.

In Example 1, for example, the first time length may be smaller than or equal to a time length of consecutive burst cycles within the survival period.

In some implementations of Example 1, the first information may further include at least one of:

PDB time of at least one packet, PDB time of each packet, a packet PDB of a target packet within at least one burst within a second time length, a packet PDB of the target packet within each burst within the second time length, an average PDB value of PDB time of the target packet within at least one burst cycle within the second time length, an average PDB value of PDB time of the target packet within each burst cycle within the second time length, a maximum PDB value of PDB time of the target packet within at least one burst cycle within the second time length, a maximum PDB value of PDB time of the target packet within each burst cycle within the second time length, a minimum PDB value of PDB time of the target packet within at least one burst cycle within the second time length, a minimum PDB value of PDB time of the target packet within each burst cycle within the second time length, PDB time of the target packet within a third time length, and average PDB time of the target packet or each packet within a fourth time length.

For example, the target packet may be a last packet within a burst cycle, or the target packet may be a first packet within a burst cycle.

For example, the second time length may be a time length of M burst cycles as determined based on the survival time, where M is a positive integer.

For example, the third time length may be a time length of a burst cycle.

For example, the fourth time length may be a time length of the M burst cycles as determined based on the survival time, where M is a positive integer; or the fourth time length may be a time length of a burst cycle.

Therefore, based on the solution of Example 1 above, the first device directly indicates the PDB information to the second device. The method for determining whether the transmission delay of a message, burst, or packet exceeds the PDB at one end is clarified, which ensures the transmission performance of the TSC service.

In the above example 1, for example, the first device may be a terminal device, and the second device may be a network device. Specifically, the process shown in FIG. 3 may be included, and the process shown in FIG. 3 specifically includes S11-S13.

At S11, the network device configures or indicates information/configuration related to the survival time to the terminal device.

The information/configuration related to the survival time may include, but not limited to, at least one of:

a data transmission direction (for example, uplink or downlink direction), the survival time, a DRB identifier, a QoS flow identifier, a PDU session identifier, service arrival time, a service pattern, a service cycle, and the first indication information.

At S12, the terminal device calculates the PDB.

At S13, the terminal device transmits the PDB information to the network device. For the content included in the PDB information, reference can be made to the content included in the first information in Example 1 above, and details thereof will be omitted here.

In some embodiments, as Example 2, the first information may be packet start time information, or the first information may be packet arrival information, and the first information may include, but not limited to, at least one of:

average packet arrival time within at least one burst, average packet arrival time within each burst, packet arrival time of a target packet within at least one burst within a fifth time length, packet arrival time of a target packet within each burst within the fifth time length, a maximum value of arrival time of the target packet within at least one burst within the fifth time length, a maximum value of arrival time of the target packet within each burst within the fifth time length, a minimum value of arrival time of the target packet within at least one burst within the fifth time length, a minimum value of arrival time of the target packet within each burst within the fifth time length, a maximum value of packet arrival time within the fifth time length, a minimum value of packet arrival time within the fifth time length, a maximum value of packet arrival time within at least one burst, a maximum value of packet arrival time within each burst, a minimum value of packet arrival time within at least one burst, a minimum value of packet arrival time within each burst, maximum average packet arrival time within the fifth time length, minimum average packet arrival time within the fifth time length, average packet arrival time within the fifth time length, packet arrival time of at least one packet, packet arrival time of each packet, average packet arrival time of the target packet within at least one burst, average packet arrival time of the target packet within each burst, packet arrival time of the target packet in at least one burst, packet arrival time of the target packet in each burst, maximum average packet arrival time of the target packet in the fifth time length, minimum average packet arrival time of the target packet in the fifth time length, average packet arrival time of the target packet in the fifth time length, packet arrival time of the target packet within at least one burst, and packet arrival time of the target packet within each burst.

For example, the maximum average packet arrival time may be a maximum value among average packet arrival time within at least one burst within the fifth time length.

For example, the fifth time length may be determined based on survival time.

For example, the fifth time length may be smaller than or equal to a time length of the consecutive burst cycles within the survival period.

In some implementations of Example 2, the first information may further include at least one of:

time at which at least one packet arrives at a PDCP layer, time at which each packet arrives at the PDCP layer, an average value of differences between time at which a target packet arrives at the PDCP layer and time at which a first packet arrives at the PDCP layer within a sixth time length, a difference between the time at which the target packet arrives at the PDCP layer and the time at which the first packet arrives at the PDCP layer within at least one burst within the sixth time length, a difference between the time at which the target packet arrives at the PDCP layer and the time at which the first packet arrives at the PDCP layer within each burst within the sixth time length, a maximum value among differences between the time at which the target packet arrives at the PDCP layer and the time at which the first packet arrives at the PDCP layer within the sixth time length, a minimum value among differences between the time at which the target packet arrives at the PDCP layer and the time at which the first packet arrives at the PDCP layer within the sixth time length, a maximum value of time at which a packet arrives at the PDCP layer within the sixth time length, a minimum value of time at which a packet arrives at the PDCP layer within the sixth time length, time at which the target packet arrives at the PDCP layer within a seventh time length, a maximum value among differences between time at which the target packet arrives at the PDCP layer and time at which a first packet arrives at the PDCP layer within the seventh time length, a minimum value among differences between time at which the target packet arrives at the PDCP layer and time at which a first packet arrives at the PDCP layer within the seventh time length, a difference between the time at which the target packet arrives at the PDCP layer and the time at which the first packet arrives at the PDCP layer within the seventh time length, time at which all packets arrive at the PDCP layer within the seventh time length, a maximum value among time at which all packets arrives at the PDCP layer within the seventh time length, a minimum value among time at which all packets arrives at the PDCP layer within the seventh time length, maximum average time for all packets to arrive at the PDCP layer within at least one burst cycle, maximum average time for all packets to arrive at the PDCP layer within each burst cycle, minimum average time for all packets to arrive at the PDCP layer within at least one burst cycle, and minimum average time for all packets to arrive at the PDCP layer within each burst cycle.

For example, the sixth time length may be a time length of the N burst cycles as determined based on the survival time, where N is a positive integer.

For example, the seventh time length may be a time length of a burst cycle.

For example, the target packet may be a last packet in a burst cycle, or the target packet may be a first packet in a burst cycle.

In some implementations of Example 2, the second device may determine the PDB based on the first information. It is assumed that the first device is a terminal device, and the second device is a network device. For example, the network device may determine the PDB based on the average value of the packet arrival time and the time corresponding to the position of the Configured Grant (CG) resource. In another example, the network device may determine the PDB based on the average value of the arrival time of the target packet and the time corresponding to the position of the CG resource.

Therefore, based on the solution of Example 2 above, the first device may indicate the packet start time information or the packet arrival information to the second device. The method for determining whether the transmission delay of a message, burst, or packet exceeds the PDB according to the obtained packet start time information or packet arrival information is clarified, which ensures the transmission performance of the TSC service.

Figure 4:
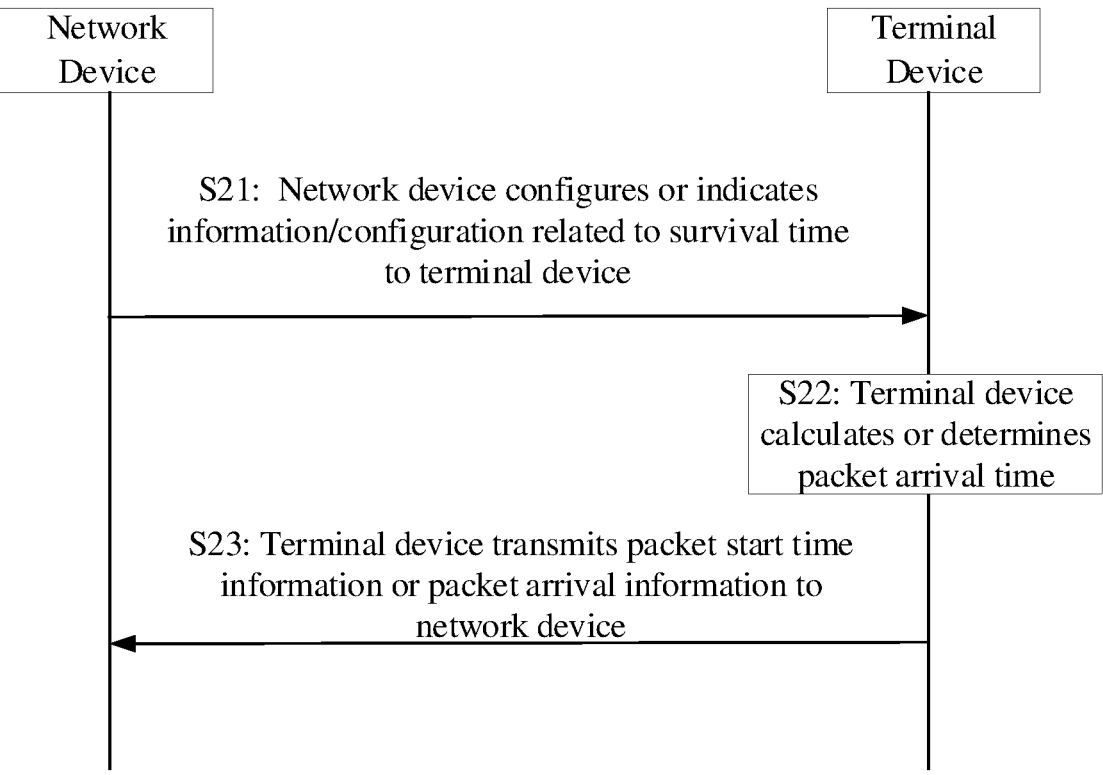
FIG. 4 is a flowchart illustrating a terminal device reporting packet start time information or packet arrival information according to an embodiment of the present disclosure.

In the above Example 2, for example, the first device may be a terminal device, and the second device may be a network device. Specifically, the process shown in FIG. 4 may be included, and the process shown in FIG. 4 specifically includes S21-S23.

At S21, the network device configures or indicates information/configuration related to the survival time to the terminal device.

The information/configuration related to the survival time may include, but not limited to, at least one of:

a data transmission direction (for example, uplink or downlink direction), the survival time, a DRB identifier, a QoS flow identifier, a PDU session identifier, service arrival time, a service pattern, a service cycle, and the first indication information.

At S22, the terminal device calculates or determines packet arrival time.

At S23, the terminal device transmits packet start time information or packet arrival information to the network device. For content included in the packet start time information or packet arrival information, reference can be made to the content included in the first information in Example 2 above, and details thereof will be here.

In some embodiments, the content included in the first information in the above Examples 1 and 2 may be reported in any of the following forms:

reporting an actual value, reporting a difference relative to a previous reported value, and reporting a difference relative to a target value.

In some embodiments, the target value may be a reported value for the target packet or a reported value for the first packet.

In some embodiments, the first device or the second device determines whether a packet or message is successfully transmitted according to transmission time of the target packet; or the first device or the second device determines whether a packet or message is successfully transmitted according to the transmission time of the target packet and the PDB; or the first device or the second device determines whether a packet or message is transmitted successfully according to arrival time of the target packet; or the first device or the second device determines whether a packet or message is transmitted successfully according to the arrival time of the target packet and the PDB.

For example, if a success indication is not received for a certain time length, or a failure indication is received, it is considered that the transmission of the packet or message is unsuccessful. In another example, if no indication is received for a specific time period, it is considered that the packet or message is transmitted successfully.

Here, the specific time length may be the transmission time of the target packet, the transmission time of the target packet and the PDB, the arrival time of the target packet, or the arrival time of the target packet and the PDB.

Therefore, in the embodiment of the present disclosure, the second device can determine at least one of the following based on the first information: a message loss, a packet loss, a PDB corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered, reported survival time not being satisfied, reconfiguration or modification of service transmission being requested towards a peer end, and whether a packet transmission delay exceeds a PDB. Therefore, the second device can accurately determine whether the transmission delay exceeds the PDB, so as to ensure the transmission performance of the TSC service.

FIG. 5 is a schematic flowchart illustrating a wireless communication method 300 according to an embodiment of the present disclosure. As shown in FIG. 5, the method 300 may include at least part of the following content.

At S310, a first device starts or activates survival time under a second condition, or the first device starts or activates monitoring of the survival time under the second condition, or the first device starts a timer corresponding to the survival time under the second condition.

The second condition includes at least one of:

a packet transmission error, a message transmission error, a packet transmission, and a message transmission.

It should be noted that the packet in the second condition may be one packet. The one packet may be: any packet, or each packet, or a specific packet, such as a target packet. The target packet may be a last packet in a burst cycle, or the target packet may be a first packet in the burst cycle. The message in the second condition may be one message, and the one message may be: any message, or each message.

In some embodiments, the packet transmission error may include:

a packet not being successfully transmitted within packet transmission time and a PDB, or the packet not being successfully transmitted within packet arrival time and the PDB, or the packet not being successfully transmitted within the PDB, or the packet not being successfully transmitted within PDCP discard time.

In some embodiments, the message transmission error may include:

a message not being successfully transmitted within packet transmission time and a PDB, or the message not being successfully transmitted within packet arrival time and the PDB, or the message not being successfully transmitted within the PDB, or the message not being successfully transmitted within PDCP discard time, or at least one packet or target packet in the message not being successfully transmitted within the packet transmission time and the PDB, or at least one packet or target packet in the message not being successfully transmitted within the packet arrival time and the PDB, or at least one packet or target packet in the message not being successfully transmitted within the PDB, or at least one packet or target packet in the message not being successfully transmitted within PDCP discard time.

In some embodiments, the target packet may be a last packet in a burst cycle, or the target packet may be a first packet in a burst cycle.

In some embodiments, the packet may include at least one of:

an SDU and a PDU.

In some embodiments, the message may include at least one of:

a MAC SDU, a MAC PDU, and a TB.

In some embodiments, the first device may be a terminal device or a network device.

In some embodiments, the first device may start or activate the survival time under the second condition, or start the timer corresponding to the survival time under the second condition, when the survival time is not started or activated or when the monitoring of the survival time is not started or activated.

In some embodiments, the first device may start the timer corresponding to the survival time under the second condition, or start or activate the survival time under the second condition, when the timer corresponding to the survival time is not started.

In some embodiments, the first device may stop the survival time when there is a successful packet or message transmission while the survival time is started or activated or the monitoring of the survival time is not started or activated, or when an indication of a successful packet or message transmission is received while the survival time is started or activated or the monitoring of the survival time is not started or activated, or when no indication of a failed packet or message transmission is received while the survival time is started or activated or the monitoring of the survival time is not started or activated.

In some embodiments, the first device may stop the timer corresponding to the survival time when there is a successful packet or message transmission while the timer corresponding to the survival time is running or the timer corresponding to the survival time is not running, or when an indication of a successful packet or message transmission is received while the timer corresponding to the survival time is running or the timer corresponding to the survival time is not running, or when no indication of a failed packet or message transmission is received while the timer corresponding to the survival time is running or the timer corresponding to the survival time is not running.

In some embodiments, when the survival time or the monitoring of the survival time expires or while the survival time is started or activated or the monitoring of the survival time is started or activated, the first device may perform at least one of:

adjusting a transmission of a packet, message, or service, rescheduling the transmission of the packet, message, or service, reconfiguring the transmission of the packet, message, or service, and reporting for the transmission of the packet, message, or service.

In some embodiments, when the timer corresponding to the survival time expires or while the timer corresponding to the survival time is running, the first device may perform at least one of:

adjusting a transmission of a packet, message, or service, rescheduling the transmission of the packet, message, or service, reconfiguring the transmission of the packet, message, or service, and reporting for the transmission of the packet, message, or service.

It should be noted that after one adjustment or using one adjusted transmission, it will automatically return to the original configuration. Further, whether to return to the original configuration depends on the network configuration.

Therefore, in the embodiment of the present disclosure, the first device starts or activates the survival time under the second condition, or the first device starts or activates monitoring of the survival time under the second condition, or the first device starts the timer corresponding to the survival time under the second condition, so as to ensure the transmission performance of the TSC service.

The method embodiments of the present disclosure have been described in detail above with reference to FIGS. 2-5, and the apparatus embodiments of the present disclosure will be described in detail below with reference to FIGS. 6-11. It can be appreciated that the apparatus embodiments and the method embodiments correspond to each other, and for similar descriptions, reference can be made to the method embodiments.

FIG. 6 shows a schematic block diagram of a wireless communication device 400 according to an embodiment of the present disclosure. The wireless communication device 400 may be a first device. As shown in FIG. 6, the wireless communication device 400 includes:

a communication unit 410 configured to transmit first information to a second device.

The first information is used by the second device to determine at least one of:

a message loss, a packet loss, a Packet Delay Budget (PDB) corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered, reported survival time not being satisfied, reconfiguration or modification of service transmission being requested towards a peer end, and whether a packet transmission delay exceeds a PDB.

In some embodiments, the first information may be the PDB information, or the first information may be packet start time information, or the first information may be packet arrival information, or the first information may be feedback information.

In some embodiments, the PDB information may be measured or calculated by the first device.

In some embodiments, the packet start time information may be measured or calculated by the first device, or the packet start time information may be information obtained or saved by the first device.

In some embodiments, the packet arrival information may be time at which the packet arrives at a Packet Data Convergence Protocol (PDCP) layer.

In some embodiments, the first information may be PDB information, and the first information may include at least one of:
a packet average PDB within at least one burst, a maximum packet average PDB within a first time length, a maximum packet PDB within at least one burst, a maximum packet PDB within the first time length, a packet average PDB within the first time length, a PDB of at least one packet, and a maximum packet PDB within the first time length.

In some embodiments, the maximum average packet PDB may be a maximum value among packet average PDBs within at least one burst within the first time length.

In some embodiments, the first time length may be determined based on survival time.

In some embodiments, the first time length may be smaller than or equal to a time length of consecutive burst cycles within the survival period.

In some embodiments, the first information further may include at least one of:
PDB time of at least one packet, a packet PDB of a target packet within at least one burst within a second time length, an average PDB value of PDB time of the target packet within at least one burst cycle within the second time length, a maximum PDB value of PDB time of the target packet within at least one burst cycle within the second time length, PDB time of the target packet within a third time length, and average PDB time of the target packet or each packet within a fourth time length.

In some embodiments, the second time length may be a time length of the M burst cycles as determined based on the survival time, where M is a positive integer.

In some embodiments, the third time length may be a time length of a burst cycle.

In some embodiments, the fourth time length may be a time length of the M burst cycles as determined based on the survival time, where M is a positive integer; or the fourth time length may be a time length of a burst cycle.

In some embodiments, the first information may be packet start time information, or the first information may be packet arrival information, and the first information may include at least one of:
average packet arrival time within at least one burst, packet arrival time of a target packet within at least one burst within a fifth time length, a maximum value of arrival time of the target packet within at least one burst within the fifth time length, a maximum value of packet arrival time within the fifth time length, a maximum value of packet arrival time within at least one burst, maximum average packet arrival time within the fifth time length, average packet arrival time within the fifth time length, packet arrival time of at least one packet, average packet arrival time of the target packet within at least one burst, packet arrival time of the target packet in at least one burst, maximum average packet arrival time of the target packet in the fifth time length, average packet arrival time of the target packet in the fifth time length, and packet arrival time of the target packet within at least one burst.

In some embodiments, the maximum average packet arrival time may be a maximum value among average packet arrival time within at least one burst within the fifth time length.

In some embodiments, the fifth time length may be determined based on survival time.

In some embodiments, the fifth time length may be smaller than or equal to a time length of consecutive burst cycles within the survival period.

In some embodiments, the first information may further include at least one of:
time at which at least one packet arrives at a PDCP layer, an average value of differences between time at which a target packet arrives at the PDCP layer and time at which a first packet arrives at the PDCP layer within a sixth time length, a difference between the time at which the target packet arrives at the PDCP layer and the time at which the first packet arrives at the PDCP layer within at least one burst within the sixth time length, a maximum value among differences between the time at which the target packet arrives at the PDCP layer and the time at which the first packet arrives at the PDCP layer within the sixth time length, a maximum value of time at which a packet arrives at the PDCP layer within the sixth time length, time at which the target packet arrives at the PDCP layer within a seventh time length, a maximum value among differences between time at which the target packet arrives at the PDCP layer and time at which a first packet arrives at the PDCP layer within the seventh time length, a difference between the time at which the target packet arrives at the PDCP layer and the time at which the first packet arrives at the PDCP layer within the seventh time length, time at which all packets arrive at the PDCP layer within the seventh time length, a maximum value among time at which all packets arrives at the PDCP layer within the seventh time length, and maximum average time for all packets to arrive at the PDCP layer within at least one burst cycle.

In some embodiments, the sixth time length may be a time length of the N burst cycles as determined based on the survival time, where N is a positive integer.

In some embodiments, the seventh time length may be a time length of a burst cycle.

In some embodiments, the wireless communication device 400 may further include a processing unit 420 configured to:
determine whether a packet or message is successfully transmitted according to transmission time of the target packet; or
determine whether a packet or message is successfully transmitted according to the transmission time of the target packet and the PDB; or
determine whether a packet or message is successfully transmitted according to arrival time of the target packet; or
determine whether a packet or message is successfully transmitted according to the arrival time of the target packet and the PDB.

In some embodiments, the target packet may be a last packet in a burst cycle, or the target packet may be a first packet in a burst cycle.

In some embodiments, the content included in the first information may be reported in any of the following forms: reporting an actual value, reporting a difference relative to a previous reported value, and reporting a difference relative to a target value.

In some embodiments, the first information may be for at least one of:

a terminal, a Data Radio Bearer (DRB), a Quality of Service (QoS) flow, a Protocol Data Unit (PDU) session, a logical channel, a logical channel group, a Service Data Unit (SDU), and a PDU.

In some embodiments, the first information may be feedback information, the feedback information being carried in at least one of: Downlink Control Information (DCI), a Hybrid Automatic Repeat Request Acknowledgement (HARQ-ACK), a Radio Link Control (RLC) status PDU, and a PDCP status PDU.

In some embodiments, the packet may include at least one of:

an SDU and a PDU.

In some embodiments, the message may include at least one of:

a Media Access Control (MAC) SDU, a MAC PDU, and a Transport Block (TB).

In some embodiments, the communication unit 410 may be configured to:

transmit the first information to the second device with a target time length as a cycle.

The target time length may be a time length of the Y burst cycles, where Y is a positive integer; or the target time length is a time length of the survival time; or the target time length may be a time length smaller than or equal to consecutive burst cycles within the survival period; or the target time length may be a time length of a burst cycle; or the target time length may be a time length of each packet.

In some embodiments, the communication unit 410 may be configured to:

transmit the first information to the second device when a target event is triggered.

The target event may include at least one of:

target packet arrival, packet arrival, packet arrival time obtained, average packet arrival time obtained, maximum packet arrival time obtained, survival time reached, maximum error tolerance time reached, and maximum error reporting tolerance time reached.

In some embodiments, the communication unit 410 may be configured to:

transmit the first information to the second device according to first indication information and/or a first condition.

The first condition may include survival time being configured or indicated, or the first condition includes the first indication information being configured or indicated, and the first indication information may be used to instruct the first device to report or indicate the first information to the second device.

In some embodiments, the first device may be a terminal device, and the second device may be a network device; or the first device may be a network device, and the second device may be a terminal device.

Optionally, in some embodiments, the above communication unit may be a communication interface or a transceiver, or an input/output interface of a communication chip or a system-on-chip.

It can be appreciated that the wireless communication device 400 according to the embodiment of the present disclosure may correspond to the first device in the method embodiment of the present disclosure, and the above and other operations and/or functions of the respective units in the wireless communication device 400 are provided for the purpose of implementing the process flow corresponding to the first device in the method 200 shown in FIG. 2, and details thereof will be not omitted here for brevity.

FIG. 7 shows a schematic block diagram of a wireless communication device 500 according to an embodiment of the present disclosure. The wireless communication device 500 may be a second device. As shown in FIG. 7, the wireless communication device 500 includes:

a communication unit 510 configured to receiving, by a second device, first information transmitted by a first device.

The first information is used by the second device to determine at least one of:

a message loss, a packet loss, a Packet Delay Budget (PDB) corresponding to a message, a PDB corresponding to a packet, a survival time not being satisfied, a time cycle or time period or condition in which the message loss cannot be tolerated being reached, and a time cycle or time period or condition in which the packet loss cannot be tolerated being reached, modification or reconfiguration or selection satisfying service transmission being triggered, reconfiguration or scheduling being triggered, reported survival time not being satisfied, reconfiguration or modification of service transmission being requested towards a peer end, and whether a packet transmission delay exceeds the PDB.

In some embodiments, the first information may be the PDB information, or the first information may be packet start time information, or the first information may be packet arrival information, or the first information may be feedback information.

In some embodiments, the PDB information may be measured or calculated by the first device.

In some embodiments, the packet start time information may be measured or calculated by the first device, or the packet start time information may be information obtained or saved by the first device.

In some embodiments, the packet arrival information may be time at which the packet arrives at a Packet Data Convergence Protocol (PDCP) layer.

In some embodiments, the first information may be PDB information, and the first information may include at least one of:

a packet average PDB within at least one burst, a maximum packet average PDB within a first time length, a maximum packet PDB within at least one burst, a maximum packet PDB within the first time length, a packet average PDB within the first time length, a PDB of at least one packet, and a maximum packet PDB within the first time length.

In some embodiments, the maximum average packet PDB may be a maximum value among packet average PDB s within at least one burst within the first time length.

In some embodiments, the first time length may be determined based on survival time.

In some embodiments, the first time length may be smaller than or equal to a time length of consecutive burst cycles within the survival period.

In some embodiments, the first information may further include at least one of:

PDB time of at least one packet, a packet PDB of a target packet within at least one burst within a second time length, an average PDB value of PDB time of the target packet within at least one burst cycle within the second time length, a maximum PDB value of PDB time of the target packet within at least one burst cycle within the second time length, PDB time of the target packet within a third time length, and average PDB time of the target packet or each packet within a fourth time length.

In some embodiments, the second time length may be a time length of M burst cycles as determined based on the survival time, where M is a positive integer.

In some embodiments, the third time length may be a time length of a burst cycle.

In some embodiments, the fourth time length may be a time length of the M burst cycles as determined based on the survival time, where M is a positive integer; or the fourth time length may be a time length of a burst cycle.

In some embodiments, the first information may be packet start time information, or the first information may be packet arrival information, and the first information may include at least one of:

average packet arrival time within at least one burst, packet arrival time of a target packet within at least one burst within a fifth time length, a maximum value of arrival time of the target packet within at least one burst within the fifth time length, a maximum value of packet arrival time within the fifth time length, a maximum value of packet arrival time within at least one burst, maximum average packet arrival time within the fifth time length, average packet arrival time within the fifth time length, packet arrival time of at least one packet, average packet arrival time of the target packet within at least one burst, packet arrival time of the target packet in at least one burst, maximum average packet arrival time of the target packet in the fifth time length, average packet arrival time of the target packet in the fifth time length, and packet arrival time of the target packet within at least one burst.

In some embodiments, the maximum average packet arrival time may be a maximum value among average packet arrival time within at least one burst within the fifth time length.

In some embodiments, the fifth time length may be determined based on survival time.

In some embodiments, the fifth time length may be smaller than or equal to a time length of consecutive burst cycles within the survival period.

In some embodiments, the first information may further include at least one of:

time at which at least one packet arrives at a PDCP layer, an average value of differences between time at which a target packet arrives at the PDCP layer and time at which a first packet arrives at the PDCP layer within a sixth time length, a difference between the time at which the target packet arrives at the PDCP layer and the time at which the first packet arrives at the PDCP layer within at least one burst within the sixth time length, a maximum value among differences between the time at which the target packet arrives at the PDCP layer and the time at which the first packet arrives at the PDCP layer within the sixth time length, a maximum value of time at which a packet arrives at the PDCP layer within the sixth time length, time at which the target packet arrives at the PDCP layer within a seventh time length, a maximum value among differences between time at which the target packet arrives at the PDCP layer and time at which a first packet arrives at the PDCP layer within the seventh time length, a difference between the time at which the target packet arrives at the PDCP layer and the time at which the first packet arrives at the PDCP layer within the seventh time length, time at which all packets arrive at the PDCP layer within the seventh time length, a maximum value among time at which all packets arrives at the PDCP layer within the seventh time length, and maximum average time for all packets to arrive at the PDCP layer within at least one burst cycle.

In some embodiments, the sixth time length may be a time length of the N burst cycles as determined based on the survival time, where N is a positive integer.

In some embodiments, the seventh time length may be a time length of a burst cycle.

In some embodiments, the wireless communication device may further include a processing unit 520 configured to:

determine whether a packet or message is successfully transmitted according to transmission time of the target packet; or determine whether a packet or message is successfully transmitted according to the transmission time of the target packet and the PDB; or determine whether a packet or message is successfully transmitted according to arrival time of the target packet; or determine whether a packet or message is successfully transmitted according to the arrival time of the target packet and the PDB.

In some embodiments, the target packet may be a last packet in a burst cycle, or the target packet may be a first packet in a burst cycle.

In some embodiments, the content included in the first information may be reported in any of the following forms:

reporting an actual value, reporting a difference relative to a previous reported value, and reporting a difference relative to a target value.

In some embodiments, the first information may be for at least one of:

a terminal, a Data Radio Bearer (DRB), a Quality of Service (QoS) flow, a Protocol Data Unit (PDU) session, a logical channel, a logical channel group, a Service Data Unit (SDU), a PDU.

In some embodiments, the first information may be feedback information, the feedback information being carried in at least one of: Downlink Control Information (DCI), a Hybrid Automatic Repeat Request Acknowledgement (HARQ-ACK), a Radio Link Control (RLC) status PDU, and a PDCP status PDU.

In some embodiments, the packet may include at least one of:

an SDU and a PDU.

In some embodiments, the message may include at least one of:

a Media Access Control (MAC) SDU, a MAC PDU, and a Transport Block (TB).

In some embodiments, the first device may be a terminal device, and the second device may be a network device; or the first device may be a network device, and the second device may be a terminal device.

Optionally, in some embodiments, the above communication unit may be a communication interface or a transceiver, or an input/output interface of a communication chip or a system-on-chip.

It can be appreciated that the wireless communication device 500 according to the embodiment of the present disclosure may correspond to the first device in the method embodiment of the present disclosure, and the above and other operations and/or functions of the respective units in the wireless communication device 500 are provided for the purpose of implementing the process flow corresponding to the second device in the method 200 shown in FIG. 2, and details thereof will be not omitted here for brevity.

FIG. 8 shows a schematic block diagram of a wireless communication device 600 according to an embodiment of the present disclosure. As shown in FIG. 8, the wireless communication device 600 includes:

a processing unit 610 configured to start or activate survival time under a second condition, or start or activate monitoring of the survival time under the second condition, or start a timer corresponding to the survival time under the second condition.

The second condition may include at least one of:
a packet transmission error, a message transmission error, a packet transmission, and a message transmission.

In some embodiments, the processing unit 610 may be configured to:

start or activate the survival time under the second condition when the survival time is not started or activated or when the monitoring of the survival time is not started or activated; or start or activate the survival time under the second condition when the timer corresponding to the survival time is not started.

In some embodiments, the processing unit 610 may be configured to:

start the timer corresponding to the survival time under the second condition when the timer corresponding to the survival time is not started; or start the timer corresponding to the survival time under the second condition when the survival time is not started or activated or when the monitoring of the survival time is not started or activated.

In some embodiments, the processing unit 610 may be configured to:

stop the survival time when there is a successful packet or message transmission while the survival time is started or activated or the monitoring of the survival time is not started or activated, or when an indication of a successful packet or message transmission is received while the survival time is started or activated or the monitoring of the survival time is not started or activated, or when no indication of a failed packet or message transmission is received while the survival time is started or activated or the monitoring of the survival time is not started or activated.

In some embodiments, the processing unit 610 may be configured to:

stop the timer corresponding to the survival time when there is a successful packet or message transmission while the timer corresponding to the survival time is running or the timer corresponding to the survival time is not running, or when an indication of a successful packet or message transmission is received while the timer corresponding to the survival time is running or the timer corresponding to the survival time is not running, or when no indication of a failed packet or message transmission is received while the timer corresponding to the survival time is running or the timer corresponding to the survival time is not running.

In some embodiments, the processing unit 610 may be configured to:

perform, when the survival time or the monitoring of the survival time expires or while the survival time is started or activated or the monitoring of the survival time is started or activated, at least one of:

adjust a transmission of a packet, message, or service, rescheduling the transmission of the packet, message, or service, reconfiguring the transmission of the packet, message, or service, and reporting for the transmission of the packet, message, or service.

In some embodiments, the processing unit 610 may be configured to:

perform, when the timer corresponding to the survival time expires or while the timer corresponding to the survival time is running, at least one of:

adjust a transmission of a packet, message, or service, rescheduling the transmission of the packet, message, or service, reconfiguring the transmission of the packet, message, or service, and reporting for the transmission of the packet, message, or service.

In some embodiments, the packet transmission error may include:

a packet not being successfully transmitted within packet transmission time and a Packet Delay Budget (PDB), or the packet not being successfully transmitted within packet arrival time and the PDB, or the packet not being successfully transmitted within the PDB, or the packet not being successfully transmitted within Packet Data Convergence Protocol (PDCP) discard time.

In some embodiments, the message transmission error may include:

a message not being successfully transmitted within packet transmission time and a PDB, or the message not being successfully transmitted within packet arrival time and the PDB, or the message not being successfully transmitted within the PDB, or the message not being successfully transmitted within PDCP discard time, or at least one packet or target packet in the message not being successfully transmitted within the packet transmission time and the PDB, or at least one packet or target packet in the message not being successfully transmitted within the packet arrival time and the PDB, or at least one packet or target packet in the message not being successfully transmitted within the PDB, or at least one packet or target packet in the message not being successfully transmitted within PDCP discard time.

In some embodiments, the target packet may be a last packet in a burst cycle, or the target packet may be a first packet in a burst cycle.

In some embodiments, the packet may include at least one of:

a Service Data Unit (SDU) and a Protocol Data Unit (PDU).

In some embodiments, the message may include at least one of:

a Media Access Control (MAC) SDU, a MAC PDU, and a Transport Block (TB).

In some embodiments, the first device may be a terminal device or a network device.

It can be appreciated that the wireless communication device 600 according to the embodiment of the present disclosure may correspond to the first device in the method embodiment of the present disclosure, and the above and other operations and/or functions of the respective units in the wireless communication device 600 are provided for the purpose of implementing the process flow corresponding to the first device in the method 300 shown in FIG. 5, and details thereof will be not omitted here for brevity.

Figure 9:
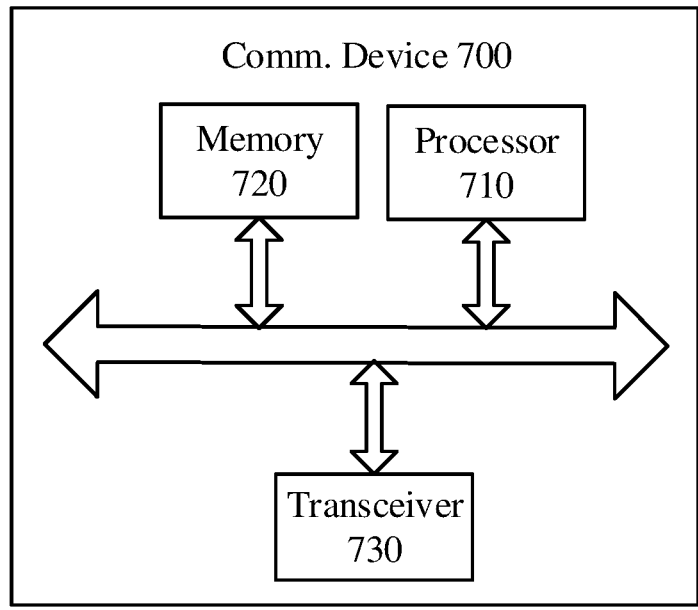
FIG. 9 is a schematic block diagram of a communication device according to another embodiment of the present disclosure.

FIG. 9 is a schematic diagram showing a structure of a communication device 700 according to an embodiment of the present disclosure. The communication device 700 shown in FIG. 9 includes a processor 710, and the processor 710 can invoke and execute a computer program from a memory to implement the method in the embodiment of the present disclosure.

Optionally, as shown in FIG. 9, the communication device 700 may further include a memory 720. The processor 710 can invoke and execute a computer program from the memory 720 to implement the method in the embodiment of the present disclosure.

The memory 720 may be a separate device independent from the processor 710, or may be integrated in the processor 710.

Optionally, as shown in FIG. 9, the communication device 700 may further include a transceiver 730, and the processor 710 may control the transceiver 730 to communicate with other devices, and in particular, transmit information or data to other devices, or receive information or data transmitted by other devices.

Here, the transceiver 730 may include a transmitter and a receiver. The transceiver 730 may further include one or more antennas.

Optionally, the communication device 700 may specifically be the first device according to the embodiment of the present disclosure, and the communication device 700 may implement the corresponding processes implemented by the first device in any of the methods according to the embodiments of the present disclosure. For the sake of brevity, details thereof will be omitted here.

Optionally, the communication device 700 may specifically be the second device according to the embodiment of the present disclosure, and the communication device 700 may implement the corresponding processes implemented by the second device in any of the methods according to the embodiments of the present disclosure. For the sake of brevity, details thereof will be omitted here.

Figure 10:
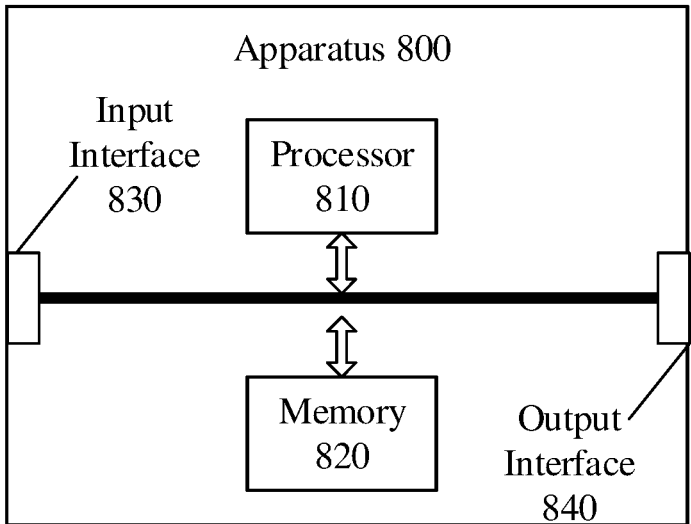
FIG. 10 is a schematic block diagram of an apparatus according to an embodiment of the present disclosure.

FIG. 10 is a schematic diagram showing a structure of an apparatus according to an embodiment of the present disclosure. The apparatus 800 shown in FIG. 10 includes a processor 810, and the processor 810 can invoke and execute a computer program from a memory to implement the method in the embodiment of the present disclosure.

Optionally, as shown in FIG. 10, the apparatus 800 may further include a memory 820. The processor 810 can invoke and execute a computer program from the memory 820 to implement the method in the embodiment of the present disclosure.

The memory 820 may be a separate device independent from the processor 810, or may be integrated in the processor 810.

Optionally, the apparatus 800 may further include an input interface 830. The processor 810 can control the input interface 830 to communicate with other devices or chips, and in particular, obtain information or data transmitted by other devices or chips.

Optionally, the apparatus 800 may further include an output interface 840. The processor 810 can control the output interface 840 to communicate with other devices or chips, and in particular, output information or data to other devices or chips.

Optionally, the apparatus can be applied to the first device in the embodiment of the present disclosure, and the apparatus can implement the corresponding processes implemented by the first device in the various methods of the embodiments of the present disclosure. For the sake of brevity, details thereof will be omitted here.

Optionally, the apparatus can be applied to the second device in the embodiment of the present disclosure, and the apparatus can implement the corresponding processes implemented by the second device in the various methods of the embodiments of the present disclosure. For the sake of brevity, details thereof will be omitted here.

Optionally, the apparatus in the embodiment of the present disclosure may be a chip, e.g., system-level chip, a system-chip, a chip system, or a system-on-chip.

Figure 11:
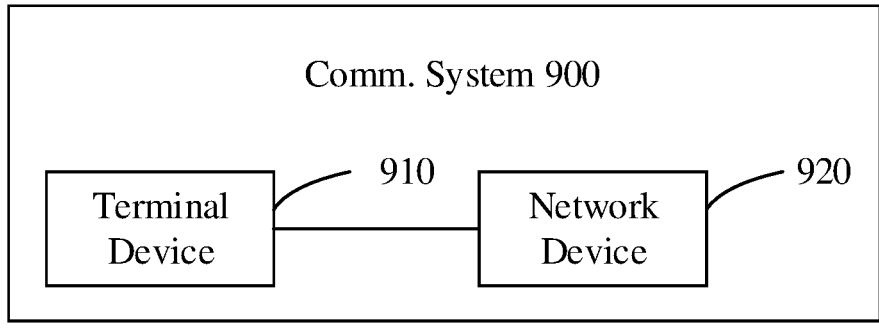
FIG. 11 is a schematic block diagram of a communication system according to an embodiment of the present disclosure.

FIG. 11 is a schematic block diagram showing a communication system 900 according to an embodiment of the present disclosure. As shown in FIG. 11, the communication system 900 includes a terminal device 910 and a network device 920.

Here, the terminal device 910 can be configured to implement the corresponding functions implemented by the first device or second device in the above method, or the network device 920 can be configured to implement the corresponding functions implemented by the first device or second device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the first device in the embodiment of the present disclosure, and the computer program can cause a computer to perform corresponding procedures implemented by the first device in the method according to any of the embodiments of the present disclosure. Details thereof will be omitted here for simplicity.

Optionally, the computer readable storage medium can be applied to the second device in the embodiment of the present disclosure, and the computer program can cause a computer to perform corresponding procedures implemented by the second device in the method according to any of the embodiments of the present disclosure. Details thereof will be omitted here for simplicity.

An embodiment of the present disclosure also provides a computer program product including computer program instructions.

Optionally, the computer program product can be applied to the first device in the embodiment of the present disclosure, and the computer program instructions can cause a computer to perform corresponding procedures implemented by the first device in the method according to any of the embodiments of the present disclosure. Details thereof will be omitted here for simplicity.

Optionally, the computer program product can be applied to the second device in the embodiment of the present disclosure, and the computer program instructions can cause a computer to perform corresponding procedures implemented by the second device in the method according to any of the embodiments of the present disclosure. Details thereof will be omitted here for simplicity.

An embodiment of the present disclosure also provides a computer program.

Optionally, the computer program can be applied to the first device in the embodiment of the present disclosure. The computer program, when executed on a computer, can cause the computer to perform corresponding procedures implemented by the first device in the method according to any of the embodiments of the present disclosure. Details thereof will be omitted here for simplicity.

Optionally, the computer program can be applied to the second device in the embodiment of the present disclosure. The computer program, when executed on a computer, can cause the computer to perform corresponding procedures implemented by the second device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure.

These variants and alternatives are to be encompassed by the scope of the present disclosure as defined by the claims as attached.

What is claimed is:

1. A wireless communication method, comprising:
transmitting, by a first device, first information to a second device,
wherein the first information is used by the second device to determine at least one of:
a message loss,
a packet loss,
a survival time not being satisfied,
a time cycle or time period or condition in which the message loss cannot be tolerated being reached,
a time cycle or time period or condition in which the packet loss cannot be tolerated being reached,
modification or reconfiguration or selection satisfying service transmission being triggered,
reconfiguration or scheduling being triggered,
reported survival time not being satisfied, or
reconfiguration or modification of service transmission being requested towards a peer end;
wherein said transmitting, by the first device, the first information to the second device comprises:
transmitting, by the first device, the first information to the second device when a target event is triggered;
wherein the target event comprises at least one of:
target packet arrival, packet arrival, packet arrival time obtained, average packet arrival time obtained, maximum packet arrival time obtained, survival time reached, maximum error tolerance time reached, and maximum error reporting tolerance time reached.

2. The method according to claim 1, wherein the first information is PDB information, or the first information is packet start time information, or the first information is packet arrival information, or the first information is feedback information.

3. The method according to claim 2, wherein the PDB information is measured or calculated by the first device.

4. The method according to claim 1, wherein the message comprises at least one of:
a Media Access Control (MAC) SDU, a MAC PDU, and a Transport Block (TB).

5. The method according to claim 1, wherein said transmitting, by the first device, the first information to the second device comprises:
transmitting, by the first device, the first information to the second device according to at least one of first indication information or a first condition, wherein
the first condition comprises survival time being configured or indicated, or the first condition comprises the first indication information being configured or indicated, and
the first indication information is used to instruct the first device to report or indicate the first information to the second device.

6. The method according to claim 1, wherein
the first device is a terminal device, and the second device is a network device; or
the first device is a network device, and the second device is a terminal device.

7. A first device, comprising:
a processor and a memory, wherein the memory is configured to store a computer program, and the processor is configured to invoke and execute the computer program stored in the memory to perform a wireless communication method comprising:

transmitting, by the first device, first information to a second device,
wherein the first information is used by the second device to determine at least one of:
a message loss,
a packet loss,
a time cycle or time period or condition in which the message loss cannot be tolerated being reached,
a time cycle or time period or condition in which the packet loss cannot be tolerated being reached,
modification or reconfiguration or selection satisfying service transmission being triggered,
reconfiguration or scheduling being triggered, reported survival time not being satisfied, or
reconfiguration or modification of service transmission being requested towards a peer end;
wherein said transmitting, by the first device, the first information to the second device comprises:
transmitting, by the first device, the first information to the second device when a target event is triggered;
wherein the target event comprises at least one of:
target packet arrival, packet arrival, packet arrival time obtained, average packet arrival time obtained, maximum packet arrival time obtained, survival time reached, maximum error tolerance time reached, and maximum error reporting tolerance time reached.

8. The first device according to claim 7, wherein the first information is PDB information, or the first information is packet start time information, or the first information is packet arrival information, or the first information is feedback information.

9. The first device according to claim 8, wherein the PDB information is measured or calculated by the first device.

10. The first device according to claim 7, wherein the message comprises at least one of:
a Media Access Control (MAC) SDU, a MAC PDU, and a Transport Block (TB).

11. The first device according to claim 7, wherein said transmitting, by the first device, the first information to the second device comprises:
transmitting, by the first device, the first information to the second device according to at least one of first indication information or a first condition, wherein
the first condition comprises survival time being configured or indicated, or the first condition comprises the first indication information being configured or indicated, and
the first indication information is used to instruct the first device to report or indicate the first information to the second device.

12. The first device according to claim 7, where
the first device is a terminal device, and the second device is a network device; or
the first device is a network device, and the second device is a terminal device.

13. A second device, comprising:
a processor and a memory, wherein the memory is configured to store a computer program, and the processor is configured to invoke and execute the computer program stored in the memory to perform a wireless communication method comprising:
receiving, by a second device, first information transmitted by a first device,
wherein the first information is used by the second device to determine at least one of:
a message loss,
a packet loss, a survival time not being satisfied, a time cycle or time period or condition in which the message loss cannot be tolerated being reached, a time cycle or time period or condition in which the packet loss cannot be tolerated being reached, modification or reconfiguration or selection satisfying service transmission being triggered, reconfiguration or scheduling being triggered, reported survival time not being satisfied, or reconfiguration or modification of service transmission being requested towards a peer end;

wherein said receiving, by the second device, the first information transmitted by the first device comprises:

receiving, by the second device, the first information, which is transmitted by the first device when a target event is triggered, wherein the target event comprises at least one of:

target packet arrival, packet arrival, packet arrival time obtained, average packet arrival time obtained, maximum packet arrival time obtained, survival time reached, maximum error tolerance time reached, and maximum error reporting tolerance time reached.

14. The second device according to claim 13, wherein the first information is PDB information, or the first information is packet start time information, or the first information is packet arrival information, or the first information is feedback information.

15. The second device according to claim 13, wherein the message comprises at least one of:

a Media Access Control (MAC) SDU, a MAC PDU, and a Transport Block (TB).

16. The second device according to claim 13, wherein said receiving, by the second device, the first information transmitted by the first device comprises:

receiving, by the second device, the first information, which is transmitted by the first device according to at least one of first indication information or a first condition, wherein the first condition comprises survival time being configured or indicated, or the first condition comprises the first indication information being configured or indicated, and the first indication information is used to instruct the first device to report or indicate the first information to the second device.

17. The second device according to claim 13, wherein the first device is a terminal device, and the second device is a network device; or the first device is a network device, and the second device is a terminal device.

* * * * *